United States Patent
Moorthy et al.

(10) Patent No.: US 9,229,544 B2
(45) Date of Patent: Jan. 5, 2016

(54) METHOD AND APPARATUS FOR PROCESSING CONTENT WRITTEN IN AN APPLICATION FORM USING AN E-PEN

(71) Applicant: Jeswill Hitech Solutions Pvt. Ltd., Bangalore (IN)

(72) Inventors: Parthasarathy Srinivasa Moorthy, Bangalore (IN); Pailla Balakrishna Reddy, Bangalore (IN)

(73) Assignee: Jeswill Hitech Solutions Pvt. Ltd., Bangalore (IN)

( * ) Notice: Subject to any disclaimer, the term of this patent is extended or adjusted under 35 U.S.C. 154(b) by 112 days.

(21) Appl. No.: 14/057,658

(22) Filed: Oct. 18, 2013

(65) Prior Publication Data

US 2014/0044357 A1 Feb. 13, 2014

Related U.S. Application Data

(63) Continuation-in-part of application No. PCT/IN2012/000281, filed on Apr. 18, 2012.

(30) Foreign Application Priority Data

Apr. 18, 2011 (IN) .......................... 1337/CHE/2011

(51) Int. Cl.
*G06K 9/00* (2006.01)
*G06F 3/0354* (2013.01)
*G06F 17/24* (2006.01)
*G06K 9/22* (2006.01)

(52) U.S. Cl.
CPC .......... *G06F 3/03545* (2013.01); *G06F 17/243* (2013.01); *G06K 9/00463* (2013.01); *G06K 9/222* (2013.01)

(58) Field of Classification Search
None
See application file for complete search history.

(56) References Cited

U.S. PATENT DOCUMENTS

| | | | |
|---|---|---|---|
| 5,890,085 A * | 3/1999 | Corrado et al. | B60N 2/002 180/271 |
| 2002/0067854 A1 | 6/2002 | Reintjes et al. | |
| 2002/0141660 A1 | 10/2002 | Bellavita et al. | |
| 2002/0146170 A1 | 10/2002 | Rom | |
| 2003/0179201 A1* | 9/2003 | Thacker | 345/441 |
| 2004/0064486 A1* | 4/2004 | Braun et al. | 707/203 |
| 2006/0218134 A1* | 9/2006 | Simske et al. | G06F 17/30705 1/1 |
| 2007/0263931 A1* | 11/2007 | Sheets | 382/186 |

OTHER PUBLICATIONS

International Search Report for International Application No. PCT/IN2012/000281 dated Oct. 12, 2012, 6 pages.

(Continued)

*Primary Examiner* — Hadi Akhavannik
(74) *Attorney, Agent, or Firm* — Nixon Peabody LLP

(57) ABSTRACT

A method and apparatus process content written in an application form. In one embodiment, stroke data corresponding to content written in fields of an application form is obtained from an e-pen. Then, words corresponding to the written content are extracted from the stroke data and confidence value is assigned to each of the words with respect to each of fields in the template application form. Each of the words corresponding to the written content is mapped to one of the fields in the template application form based on the confidence value assigned to each of the words. Moreover, a tag is assigned to each of the words indicating a mapping between each of the words and one of the fields, and the words along with the assigned tags are stored in the storage unit.

10 Claims, 4 Drawing Sheets

(56) References Cited

OTHER PUBLICATIONS

Written Opinion for International Application No. PCT/IN2012/000281 dated Oct. 12, 2012, 9 pages.
Written Opinion for International Application No. PCT/IN2012/000281 dated Jun. 17, 2013, 8 pages.
De Cao Tran et al., "Form Recognition from ink strokes on tablet," Jan. 1, 2010, pp. 293-299.
R. Radhika et al., "Form Processing Through Handwritting Input Device," Oct. 31, 2011, pp. 32-35.
Jagannadan Varadarajan et al., "Digital Ink to Form Alignment for Electronic Clipboard Devices," Sep. 16, 2008, 7 pages.

* cited by examiner

```
┌─────────────────────────────────────────────────────────────────────────┐
│  OBTAIN STROKE DATA CORRESPONDING TO CONTENT WRITTEN IN FIELDS OF AN    │
│           APPLICATION FORM FROM AN E-PEN 402                            │
└─────────────────────────────────────────────────────────────────────────┘

CORRECT POSITION ERRORS IN THE STROKE DATA USING A TRAINED DATA SET 404

COMPUTE SKEW ANGLE ASSOCIATED WITH THE STROKE DATA WITH RESPECT TO THE
                        TEMPLATE APPLICATION FORM 406

CORRECT SKEW ERRORS ASSOCIATED WITH THE STROKE DATA BASED ON THE COMPUTED
                                SKEW ANGLE 408

EXTRACT WORDS CORRESPONDING TO THE WRITTEN CONTENT FROM THE STROKE DATA 410

┌─────────────────────────────────────────────────────────────────────────┐
│ ASSIGN CONFIDENCE VALUE TO EACH OF THE WORDS WITH RESPECT TO EACH OF FIELDS IN │
│                 THE TEMPLATE APPLICATION FORM 412                       │
└─────────────────────────────────────────────────────────────────────────┘

MAP EACH OF THE WORDS CORRESPONDING TO THE WRITTEN CONTENT TO ONE OF THE
         FIELDS IN THE TEMPLATE APPLICATION FORM BASED ON THE CONFIDENCE VALUE ASSIGNED
                           TO EACH OF THE WORDS 414

ASSIGN A TAG TO EACH OF THE WORDS INDICATING A MAPPING BETWEEN EACH OF THE
                        WORDS AND ONE OF THE FIELDS 416

┌─────────────────────────────────────────────────────────────────────────┐
│      STORE THE WORDS ALONG WITH THE ASSIGNED TAGS IN A STORAGE UNIT 418 │
└─────────────────────────────────────────────────────────────────────────┘
```

```
┌─────────────────────────────────────────────────────────────────────┐
│   COMPUTE AN INITIAL CONFIDENCE MATRIX BASED ON DISTANCE BETWEEN    │
│   FIELDS AND WORDS CORRESPONDING TO STROKE DATA 502                 │
└─────────────────────────────────────────────────────────────────────┘

NORMALIZE AND FILTER THE INITIAL CONFIDENCE MATRIX 504

COMPUTE DISTANCE BETWEEN THE WORDS CORRESPONDING TO THE WRITTEN CONTENT 506

DETERMINE A BEST PROBABLE FIELD FOR EACH OF THE WORDS 508
```
```
┌─────────────────────────────────────────────────────────────────────┐
│     COMPUTE A SCORE FOR MAPPING ONE OR MORE WORDS TO EACH OF THE FIELDS 510     │
└─────────────────────────────────────────────────────────────────────┘

TRANSFORM A SCORE FOR MAPPING EACH WORDS TO CORRECT FIELD INTO A LIKELIHOOD
                     AND UPDATE THE PROBABILITY MATRIX 512
```
```
┌─────────────────────────────────────────────────────────────────────┐
│                 NORMALIZE THE UPDATED PROBABILITY MATRIX 514        │
└─────────────────────────────────────────────────────────────────────┘

ASSOCIATED ALL OF THE WORDS CORRESPONDING TO THE WRITTEN CONTENT TO CORRECT
                                 FIELDS 516
```

METHOD AND APPARATUS FOR PROCESSING CONTENT WRITTEN IN AN APPLICATION FORM USING AN E-PEN

CROSS-REFERENCE TO RELATED APPLICATIONS

This application is a continuation-in-part of PCT Application No. PCT/IN2012/000281, filed Apr. 18, 2012, which claims the benefit of Indian Patent Application No. 1337/CHE/2011, filed Apr. 18, 2011. The contents of the aforementioned applications are hereby incorporated by reference in their entirety.

FIELD OF THE INVENTION

The present invention relates to data processing systems, and more particularly relates to processing content written in an application form using an e-pen.

BACKGROUND

E-Pen provides written content on an application form in form of strokes. The strokes position obtained from the e-pen may have non linear distortions. For example, the strokes have in-accuracies which vary very widely along the width and height of the application form. For example, the tilt in the e-pen while writing on the application form may result in in-accuracies in the data. If you map the co-ordinates the stroke data directly to the application form, lot of errors may occur due to the tilt in the e-pen and in-accuracies of the stroke data.

Typically, content written using an e-pen on an application form is recognized first and then stored in database in corresponding fields of the application form. Many engines are currently known for recognizing written strokes of the e-pen. However, none of the existing recognition engines provide the corresponding position of the pen content to remove inaccuracies in e-pen data.

Consider an empty application form with exact spatial locations of fields as shown in FIG. 1A. As shown, the application form includes name field, date field and age field along with their respective spatial location. For example, the name field starts at 3" and ends at 4" in Y direction and starts at 2" and ends at 10" in X direction.

Consider that, a user writes content in fields of the application form using an e-pen as shown in FIG. 1B. When the content is filled in each field, the written content like 18 in the age field along with the start location (X, Y) and end location of word (X,Y) is recorded in the e-pen. The stored content or pen strokes along with respective spatial locations are then mapped with corresponding fields of a template application form. For example, upon mapping, the recognition engine may recognize that the pen strokes 18 belong to the age field and 25-02-2010 belong to the date field. This may be the case when the e-pen data does not have inaccuracies. In majority of the cases, the e-pen may provide in-accurate data due to the tilt of the e-pen as well as inherent errors in the e-pen, resulting in mapping of the pen strokes to the wrong fields of the template application form.

BRIEF DESCRIPTION OF THE ACCOMPANYING DRAWINGS

Figures 1A, 1B:
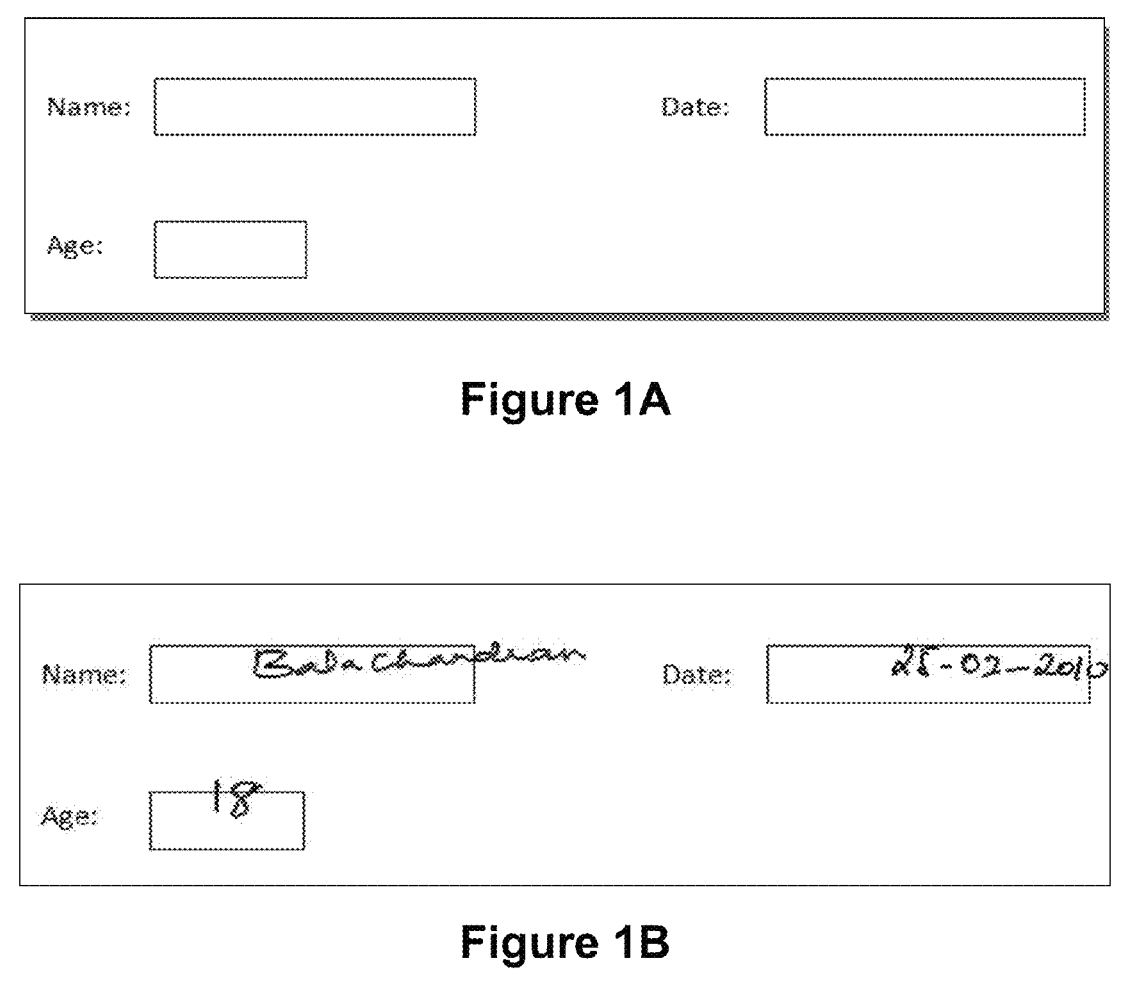

FIG. 1A illustrates a schematic representation of an empty application form, in the context of the invention.

FIG. 1B illustrate a schematic representation of an application form with content written using e-pen, in the context of the invention.

FIG. 4 is a process flowchart illustrating an exemplary method of processing content written in an application form, according to one embodiment.

FIG. 5 is a process flowchart illustrating an exemplary method of assigning confidence to words associated with stroke data written in the application form, according to one embodiment.

The drawings described herein are for illustration purposes only and are not intended to limit the scope of the present disclosure in any way.

DETAILED DESCRIPTION

The present invention provides a method and apparatus for processing content written in an application form using an electronic pen (e-pen). In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

Figure 2:
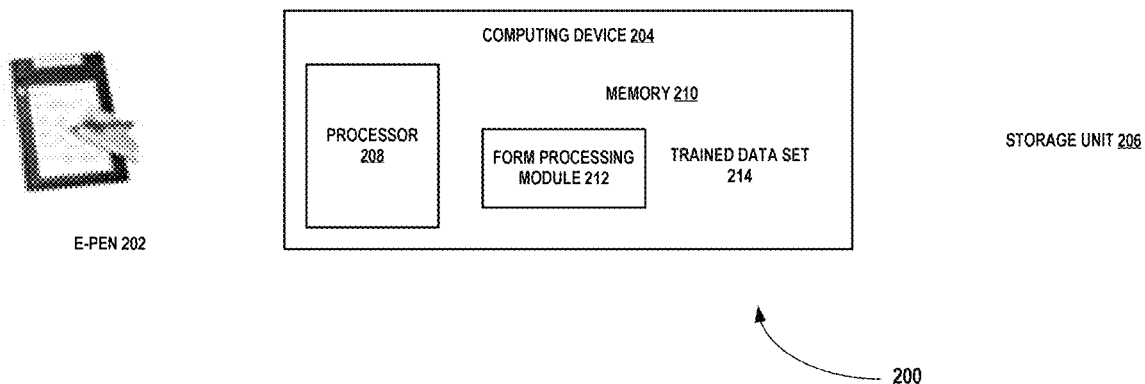
FIG. 2 illustrates a block diagram of a form processing system, according to one embodiment.

FIG. 2 illustrates a block diagram of a form processing system 200, according to one embodiment. In FIG. 2, the form processing system 200 includes an e-pen 202, a computing device 204, and a storage unit 206. The computing device 204 may be a personal computer, laptop, tablet, smart phone, and the like. The computing device 204 includes a processor 208 and memory 210 having a form processing module 212 stored therein.

When a user fills content in fields of an application form using the e-pen 202, the e-pen 202 captures stroke data corresponding to the written content and stores the stroke data in a non-volatile memory. The computing device 204 obtains the stroke data stored in the e-pen 202 when the e-pen 202 is connected to the computing device 204.

In an exemplary operation, the form processing module 212 performs enhancement of the stroke data corresponding to the written content by removing noise (e.g., wild points and distances between points within each stroke) from the stroke data and smoothening the stroke data. The form processing module 212 corrects position errors in the obtained stroke data using a trained data set 214. Typically, when a user fills content in an application form, actual point and captured point associated with the written content do not match due to inaccuracies in capturing the written content. Thus, in the present invention, the trained data set 214 indicating a relationship between actual point and captured point associated with the stroke data is formed in an offline mode using a neural network and stored in the memory. The form processing module 212 uses the trained data set 214 to resolve position errors in the strokes captured by the e-pen during filling the content in the application form. This helps the form processing module 212 to efficiently map the captured content to the fields in the application form.

The form processing module 212 computes a skew angle associated with the obtained stroke data and corrects skew errors associated with the obtained stroke data based on the computed skew angle. The stroke data captured by the e-pen 202 may contain skew errors due to improper placement of the application form or improper clipping of device to the application form.

The form processing module 212 extracts words corresponding to the written content from the stroke data. The form processing module 212 also assigns confidence value to each of the words associated with the stroke data with respect to each of fields in a template application form based on distance between the fields in the template application form and each of the words. In one embodiment, for each word, confidence value is normalized with respect to the fields. This helps increase the confidence of the given word towards the field to which the word belongs. The process of assigning the confidence value is repeated till all the words are correctly mapped to the correct fields in the application. The process of assigning the confidence to the words associated with the stroke data is illustrated in greater detail in FIG. 5.

Accordingly, the form processing module 212 maps each of the words corresponding to the written content to one of the fields in the template application form based on the confidence value assigned to each of the words. Finally, the form processing module 212 assigns a tag to each of the words indicating a mapping between each of the words and one of the fields, and stores the words corresponding to the written content and the associated tags in the storage unit 106.

Figure 3:
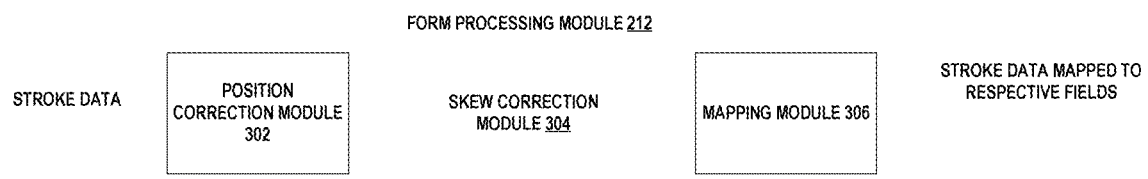
FIG. 3 is an exploded view of a form processing module such as those shown in FIG. 2, according to one embodiment.

FIG. 3 is an exploded view of the form processing module 212, according to one embodiment. In FIG. 3, the form processing module 212 includes a position correction module 302, a skew correction module 304, and a mapping module 306.

For example, the position correction module 302 corrects position errors in stroke data corresponding to content written in an application form using a trained data set 214. The skew correction module 304 computes a skew angle associated with the stroke data and corrects skew errors associated with the stroke data based on the computed skew angle.

The mapping module 306 extracts words corresponding to the written content from the stroke data and assigns a confidence value to each of the words associated with the stroke data with respect to each of fields in the template application form. The mapping module 308 maps each of the words corresponding to the written content to one of the fields in the template application form based on the confidence value assigned to each of the words. Finally, the mapping module 310 assigns a tag to each of the words indicating a mapping between each of the words and one of the fields and stores the words along with the assigned tags in the storage unit 106.

FIG. 4 is a process flowchart 400 illustrating an exemplary method of processing content written in an application form, according to one embodiment. At step 402, stroke data corresponding to content written in fields of an application form is obtained from the e-pen 202. At step 404, position errors in the stroke data are corrected using the trained data set 214. At step 406, skew angle associated with the stroke data is computed. At step 408, skew errors associated with the stroke data are corrected based on the computed skew angle.

At step 410, words corresponding to the written content are extracted from the stroke data. At step 412, confidence value is assigned to each of the words with respect to each of fields in the template application form. At step 414, each of the words corresponding to the written content is mapped to one of the fields in the template application form based on the confidence value assigned to each of the words. At step 416, a tag is assigned to each of the words indicating a mapping between each of the words and one of the fields. At step 418, the words along with the assigned tags are stored in the storage unit 106.

In one embodiment, the form processing module 112 may be stored in the memory 110 in the form of instructions, that when executed by the processor 108, cause the processor 108 to perform a method steps of FIG. 4. In another embodiment, the form processing module 112 may be stored in a computer-readable storage medium in the form of instructions, that when executed by the processor 108, cause the processor 108 to perform the method steps of FIG. 4.

FIG. 5 is a process flowchart 500 illustrating an exemplary method of assigning confidence to words associated with the stroke data and mapping the words to appropriate fields of a template application form, according to one embodiment. At step 501, distance between each field of a template application form and each of the words corresponding to the written content is computed. For example, geometrical coordinates (X and Y coordinates) with respect to the each word and each of the fields are determined. Based on the respective geometrical coordinates, the distance between each of the words and each field is computed. At step 502, an initial confidence matrix is computed based on the distance between the fields in the template application form and said each of words corresponding to the written content. Consider that, an application form contains four fields viz. F1, F2, F3 and F4. Also, consider that words W1, W2, W3 and W4 corresponding to the content written in the fields F1-F4 are extracted from the stroke data obtained from the e-pen. Then, distance 'd' is computed between each of the words W1-W4 and each of the fields F1-F4. An initial confidence matrix $M_{i,j}$ is computed based on the distance between the words W1-W4 and the fields F1-F4 as shown below.

$$M_{i,j} = \begin{bmatrix} d1 & d2 & d3 & d4 \\ d5 & d6 & d8 & d9 \\ d10 & d11 & d12 & d13 \\ d14 & d15 & d16 & d16 \end{bmatrix}$$

where i rows correspond to fields F1-F4 and j columns correspond to words W1-W4.

At step 504, the initial confidence matrix $M_{i,j}$ is normalized and filtered to obtain a probability matrix $P_{i,j}$. In some embodiments, the initial confidence matrix $M_{i,j}$ is normalised by computing sum of the values in each row of the initial confidence matrix $M_{i,j}$ and dividing each value in respective row by the computed sum of the values. The resultant matrix obtained upon normalization of the initial confidence matrix $M_{i,j}$ is referred as a probability matrix $P_{i,j}$ as shown below.

$$P_{i,j} = \begin{bmatrix} p1 & p2 & p3 & p4 \\ p5 & p6 & p8 & p9 \\ p10 & p11 & p12 & p13 \\ p14 & p15 & p16 & p16 \end{bmatrix}$$

The probability matrix $P_{i,j}$ includes confidence assigned each of the words with respect to each of the fields, where the confidence assigned to each of the words is normalized to values ranging from 0 to 1. Further, the values in the probability matrix $P_{i,j}$ are filtered, whereby zeros are discarded from further processing. In other words, one or more words which are assigned a confidence value '0' with respect to a particular field are discarded from further processing as it is guaranteed that these words would not belong to the particular field. This would help save processing power and time.

At step 506, distance between the words corresponding to the written content is computed. A table containing distance between each word with respect to other words is computed. For example, the table is as shown below:

TABLE 1

| WORDS | W1 | W2 | W3 | W4 |
|---|---|---|---|---|
| W1 | $D_{W11}$ | $D_{W12}$ | $D_{W13}$ | $D_{W14}$ |
| W2 | $D_{W21}$ | $D_{W22}$ | $D_{W23}$ | $D_{W24}$ |
| W3 | $D_{W31}$ | $D_{W32}$ | $D_{W33}$ | $D_{W34}$ |
| W4 | $D_{W34}$ | $D_{W24}$ | $D_{W34}$ | $D_{W44}$ |

At step 507, distance between fields of a template application form is obtained. For example, the distance between fields of each template application form may be pre-computed and stored in a memory. During real time processing, the distance values are retrieved from the memory. It can be noted that, the computed distance between the words correlates the distance between the fields of the template application form.

At step 508, a best probable field for each of the words is determined based on the computed distance between the words, the distance between the fields and the confidence value in the probability matrix $P_{i,j}$. At step 509, the one or more words are mapped to the best probable field. For example, if the word W1 should belong to the field F2 and the word W2 should belong to the field F4, then the distance ($d_{W12}$) computed between the words W1 and W2 in the table 1 should be substantially equal to the distance between the fields F2 and F4 of the template application form. If the distance between the words W1 and W2 and the fields F2 and F4 are found to be substantially same, then it is more likely that the either or both words W1 and W4 belong to the respective field F2 and F4. Also, the confidence value corresponding to the words W1 and W2 in the probability matrix $P_{i,j}$ is checked to confirm whether the words W1 and W2 belong to the fields F2 and F4 respectively. If the confidence value in the probability matrix $P_{i,j}$ indicates that a higher confidence is assigned to the words W1 and/or W2 with respect to the fields F2 and F4 respectively, then it implies that the words W1 and W2 belong to the fields F2 and F4 respectively. However, if the word W1 is assigned a higher confidence value with respect to the field F2 and the word W2 is assigned a lower confidence value with respect to the field F4, then it implies that the word W1 belongs to the field F2 and the word W4 does not belong to field F4. In such case, for each of incorrectly mapped words, a score of mapping one or more words to each of the fields is computed based on the distance between the words and distance between the fields, at step 510. For example, a score matrix $S_{i,j}$ is computed for the incorrectly mapped words based on the distance between the words ($D_w$) and the distance between the fields ($D_F$). The distance between the words ($D_w$) may be the distance between the correctly mapped word and incorrectly mapped word. Since, one word is correctly mapped to the field, there is a high possibility that the other word maps to some other field adjacent to the correctly mapped word. The score for each incorrectly mapped word is computed as measure of exponential function of ($D_w$-$D_F$) and ranges from '−1' to '+1'. Thus, the score corresponding to the incorrectly mapped words indicates a likelihood of mapping a particular word to a correct field. If there is possibility of incorrectly mapped word correctly mapping to the correct field, then the score assigned to that word with respect to the appropriate field would be +1. On the contrary, if the incorrectly mapped word does not map to any appropriate field, then a score of −1 is assigned to that word. An exemplary score matrix is shown below.

$$S_{i,j} = \begin{bmatrix} S1 & S2 & S3 & S4 \\ S5 & S6 & S8 & S9 \\ S10 & S11 & S12 & S13 \\ S14 & S15 & S16 & S16 \end{bmatrix}$$

At step 512, the probability matrix (obtained at step 504) is updated based on the likelihood of the word belonging to a particular field (i.e., the score in the score matrix $S_{i,j}$). For example, for a particular word (say W2) which is assigned a score of +1 with respect to a field (say F3), then the confidence value for the word W2 with respect to the field F3 is increased as there is high likelihood of the word W2 mapping to the field F3. At step 514, the updated probability matrix is normalized (e.g., to a value ranging from 0 to 1). The normalization process is same explained in step 504. At 516, it is determined whether all the words corresponding to the written content are correctly mapped to appropriate fields of the template application form. If some words are not yet correctly mapped to appropriate fields, then the steps 508-514 are repeated for a pre-determined number of iterations so that upon completion of pre-determined number of iterations, each of the words corresponding to the written content is mapped to the correct field of the template application form.

The present embodiments have been described with reference to specific example embodiments, it will be evident that various modifications and changes may be made to these embodiments without departing from the broader spirit and scope of the various embodiments. Furthermore, the various devices, modules, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

We claim:

1. A computer implemented method for processing content written in an application form by an electronic pen (e-pen), comprising:

obtaining stroke data corresponding to content written in a plurality of fields of an application form;

extracting words corresponding to the written content from the obtained stroke data;

computing distance between each of the words and a plurality of fields of a template application form;

assigning a confidence value to each of the words with respect to each of the plurality of fields based on a probability matrix obtained from normalization and filtering of an initial confidence matrix including the distance between each of the words and the plurality of fields of the template application form;

computing distance between the extracted words corresponding to the written content;

mapping each of the words to one of the plurality of fields based on the confidence value assigned to each of the words, distance between the plurality of fields of a template application form and the distance between the extracted words; and storing each of the words mapped to said corresponding one of the plurality of the fields in a database.

2. The method of claim 1, further comprising:
correcting position errors in the obtained stroke data using a trained data set.

3. The method of claim 1, further comprising:
computing a skew angle associated with the obtained stroke data; and
correcting skew errors associated with the obtained stroke data based on the computed skew angle.

4. The method of claim 1, wherein storing said each of the words mapped to said corresponding one of the plurality of the fields in the database comprises:
assigning a tag to each of the words mapped to the one of the plurality of fields, wherein the tag indicates a mapping between each of the words and one of the plurality of fields to which said each of the words belongs; and
storing the each of words and the assigned tag in the database.

5. The method of claim 1, wherein mapping each of the words to one of the plurality of fields comprises:
computing a score for each of the words based on the distance between the words and the distance between the plurality of fields; and
recomputing confidence value corresponding to one or more words which are incorrectly mapped to the fields of the template application form based on the respective score; and
mapping the incorrectly mapped words to appropriate fields based on the recomputed confidence value, the distance between the fields and the distance between the words.

6. An apparatus comprising:
a processor; and
memory coupled to the processor, wherein the memory includes a form processing module comprising a mapping module configured for:
extracting words from stroke data obtained from an electronic pen (e-pen), wherein the stroke data corresponds to content written in fields of application form;
computing distance between each of the words and a plurality of fields of a template application form;
assigning a confidence value to each of the words with respect to each of the plurality of fields based on a probability matrix obtained from normalization and filtering of an initial confidence matrix including the distance between each of the words and the plurality of fields of the template application form;
computing distance between the extracted words corresponding to the written content;
mapping each of the words to one of the plurality of fields based on the confidence value assigned to each of the words, distance between a plurality of fields of a template application form and the distance between the extracted words; and
storing each of the words mapped to the one of the plurality of the fields.

7. The apparatus of claim 6, wherein the form processing module comprises a position correction module configured for correcting position errors in the obtained stroke data using a trained data set.

8. The apparatus of claim 6, wherein the form processing module comprises a skew correction module configured for:
computing a skew angle associated with the obtained stroke data; and
correcting skew errors associated with the obtained stroke data based on the computed skew angle.

9. The apparatus of claim 6, wherein the mapping module is operable for:
assigning a tag to each of the words mapped to the one of the plurality of fields, wherein the tag indicates a mapping between each of the words and one of the plurality of fields to which said each of the words belongs; and
storing the each of words and the assigned tag in a storage unit.

10. The apparatus of claim 6, wherein the mapping module is configured for:
computing a score for each of the words based on the distance between the words and the distance between the plurality of fields; and
recomputing confidence value corresponding to one or more words which are incorrectly mapped to the fields of the template application form based on the respective score; and
mapping the incorrectly mapped words to appropriate fields based on the recomputed confidence value, the distance between the fields and the distance between the words.

* * * * *